United States Patent [19]
Lin et al.

[11] Patent Number: 6,051,139
[45] Date of Patent: Apr. 18, 2000

[54] DEVICE FOR FILTERING SLURRY

[75] Inventors: Juen-Kuen Lin, Kaohsiung; Chien-Hsin Lai, Kaohsiung Hsien; Peng-Yih Peng, Hsinchu, all of Taiwan

[73] Assignee: United Microelectronics Corp., Taiwan

[21] Appl. No.: 09/143,582

[22] Filed: Aug. 31, 1998

[30] Foreign Application Priority Data

Jun. 25, 1998 [TW] Taiwan ................................. 87210194

[51] Int. Cl.[7] .......................... B01D 29/90; B01D 35/22
[52] U.S. Cl. ....................... 210/416.1; 210/319; 210/456; 210/435; 451/60; 451/446
[58] Field of Search ................................ 210/319, 416.1, 210/456, 435; 451/60, 446

[56] References Cited

U.S. PATENT DOCUMENTS

| | | |
|---|---|---|
| 3,049,171 | 8/1962 | Neuerburg et al. . |
| 4,305,822 | 12/1981 | Eimer et al. . |
| 4,311,591 | 1/1982 | Eimer et al. . |
| 4,529,518 | 7/1985 | Jackson . |
| 5,542,441 | 8/1996 | Mohindra et al. . |
| 5,664,990 | 9/1997 | Adams et al. . |
| 5,993,647 | 11/1999 | Huang et al. . |

*Primary Examiner*—Thomas M. Lithgow
*Attorney, Agent, or Firm*—Knobbe, Martens, Olson & Bear, LLP

[57] ABSTRACT

A filtering device used to filter the slurry is disclosed, including a crossflow fan within the filter housing, and a driving mechanism relative to the crossflow fan under the filter housing to drive the crossflow fan spinning to agitate the slurry in the filter housing, so as to prevent the particles in the slurry from adhering to the surface of the filter. The filtering device further includes a spoiler between the crossflow fan and the filter, so that larger particles remain circulating somewhere between the tip of the spoiler and the crossflow fan, instead of flowing to the filter, to prolong the lifetime of the filter.

5 Claims, 2 Drawing Sheets

DEVICE FOR FILTERING SLURRY

CROSS-REFERENCE TO RELATED APPLICATION

This application claims the priority benefit of Taiwan application serial no. 87210194, filed Jun. 25, 1998, the full disclosure of which is incorporated herein by reference.

BACKGROUND OF THE INVENTION

1. Field of Invention

The present invention generally relates to filtering devices, and more particularly to a filtering device with a crossflow fan and a spoiler to filter slurry in the manufacturing of semiconductor devices.

2. Description of Related Art

With the steady improvement of integration in semiconductor devices, demand for more interconnects is getting higher due to the size diminishment of metal-oxide-semiconductor (MOS) transistors. It is therefore a common way to use at least two metal layers in designing integrated circuits. It is also very important, however, to have a planarization process on the rough surface of a wafer, so as to facilitate the manufacturing process of the multi-level interconnects and make the transferred wiring patterns more accurate. In addition the planarization of a wafer is the major factor affecting aligning accuracy in an alignment system. If the planarization process for a wafer is poorly done, not only the mask can not accurately focus on the wafer in the alignment system, but also the error-prone probability during the manufacturing is significantly increased.

A method of chemical-mechanical polishing (CMP) is regarded as the only technology to provide global planarization in the manufacturing of very-large scale integrated circuits (VLSI), or even ultra-large semiconductor integration (ULSI). Essentially, the CMP is based on a principle similar to a "grinding wheel" in mechanical grinding. With the aid of a reagent, the rough surface of a wafer can then be smoothly ground by using this technology.

The reagent, normally called "slurry" in a CMP process, is a mixture of colloidal silica, or dispersed alumina, with liquids of KOH of strong base and $NH_4OH$ of strong acid. The dimension of particles, which are extremely hard, in the slurry is ranged from 0.1 to 2.0 $\mu$m. Essentially, the particles of extremely high hardness in the slurry are used for grinding the rough surface of a wafer. Basically, the slurry is filtered by a filtering device before transporting to a polishing pad of a CMP machine for grinding, so as to prevent the slurry from scratching the surface of the wafer.

FIG. 1 shows a cross-sectional top view of a conventional filtering device 5. There is a filter 12 used to filter the slurry in the filter housing 10. The slurry in the filter housing 10, used by the CMP machine, is provided through a pipe by a slurry supplier (not shown) via a slurry inlet 14 on one side of the filter housing 10. In addition, the filter 12 comprises an opening, which covers a slurry outlet 16 located at the bottom of the filter housing 10, so that the slurry conveyed to the polishing pad is filtered.

When the CMP grinding is under way, the slurry used to facilitate the CMP processing is continuously supplied through a pipe to the polishing pad via the slurry outlet 16 at the bottom of the filter housing 10.

If the filtering device 5 is designed in this way, the slurry in the filter housing 10 becomes still when the filtering device 5 is idle, that is, the CMP machine is not used for grinding or does not use the slurry. Under this circumstance, it is quite often that the slurry is congealed on the surface of the filter 12 making the filter 12 congested.

Furthermore, larger particles are adhered to the surface of the filter 12 after a certain period of operation, which becomes difficult for the slurry to flow through the filter 12, because of the slow movement of the slurry, even the filtering device 5 is in operation.

The slurry flow to the polishing pad becomes irregular whenever there is congestion in the filter 12. Hence, the productivity efficiency of the CMP machine as well as the lifetime of the filter 12 are reduced.

As a summary, the conventional filtering device 5 has the following disadvantages:

1. The slurry tends to congeal into particles on the surface of the filter 12, which subsequently congests the filter 12, when the filtering device 5 is idle.
2. When there is congestion in the filter 12, the slurry supply to the polishing pad becomes irregular, which affects the productivity efficiency of the CMP machine, and reduces the lifetime of the filter 12.
3. Even in operation mode, the slurry flow becomes slow after a certain period of usage. Larger particles are adhered to the surface of the filter 12, preventing the slurry from passing through the filter 12 smoothly.

In light of the foregoing, there is a need to provide a device for filtering slurry in the manufacturing of semiconductor devices.

SUMMARY OF THE INVENTION

It is therefore an objective of the present invention to provide a device to solve the adhering problem of slurry particles on the surface of the filter, which results in congestion of the filter.

It is another objective of the present invention to provide a device, which improves the productivity efficiency of the CMP machine and prolongs the lifetime of the filter.

In accordance with the foregoing and other objectives of the present invention, a filtering device used to filter the slurry is provided, including a crossflow fan within the filter housing, and a driving mechanism relative to the crossflow fan under the filter housing to drive the crossbow fan spinning to agitate the slurry in the filter housing, so as to prevent the particles in the slurry from adhering to the surface of the filter. The filtering device further includes a spoiler between the crossflow fan and the filter, so that larger particles remain circulating somewhere between the tip of the spoiler and the crossflow fan, instead of flowing to the filter, to prolong the lifetime of the filter.

Furthermore, the filtering device in the invention includes a filter housing and a filter. The filter housing comprises a slurry inlet and a slurry outlet, where the slurry inlet is located on the first side of the filter housing, while the slurry outlet is located at the bottom of the filter housing. The filter, located within the filter housing, comprises an opening, which covers the slurry outlet.

It is to be understood that both the foregoing general description and the following detailed description are exemplary, and are intended to provide further explanation of the invention as claimed.

BRIEF DESCRIPTION OF THE DRAWINGS

The accompanying, drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
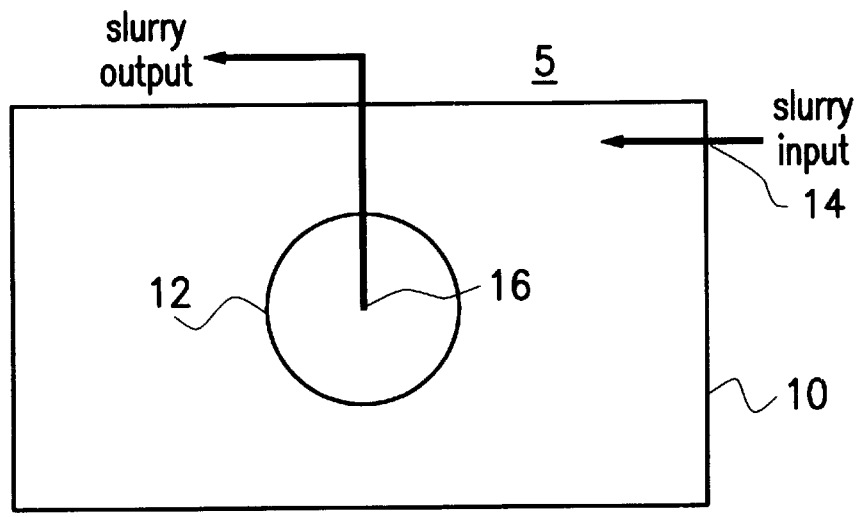
FIG. 1 is a cross-sectional top view of a conventional filter.

Reference will now be made in detail to the present preferred embodiments of the invention, examples of which are illustrated in the accompanying drawings. Wherever possible, the same reference numbers are used in the drawings and the description to refer to the same or like parts.

Figure 2:
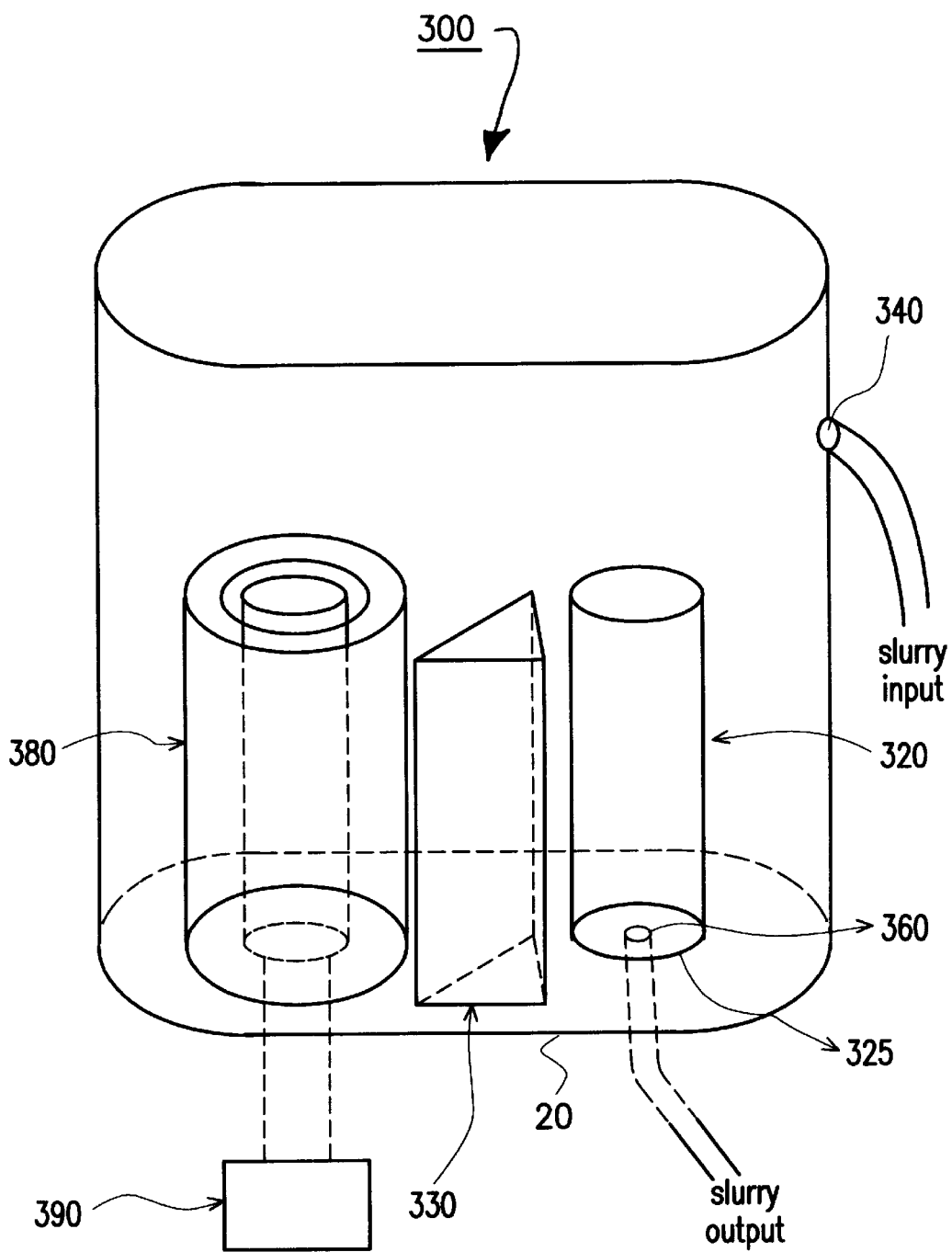
FIG. 2 is a perspective view of a filtering device according to a preferred embodiment of the present invention.

Refer to FIG. 2, which shows a perspective view of a filtering device 300 according to a preferred embodiment of the present invention. The filtering device 300 includes a filter housing 310, a filter 320, an opening 325 at the bottom of the filter 320, a slurry inlet 340, a slurry outlet 360, a spoiler 330 which is in a shape of a triangular prism, a crossflow fan 380, and a driving mechanism 390.

Figure 3:
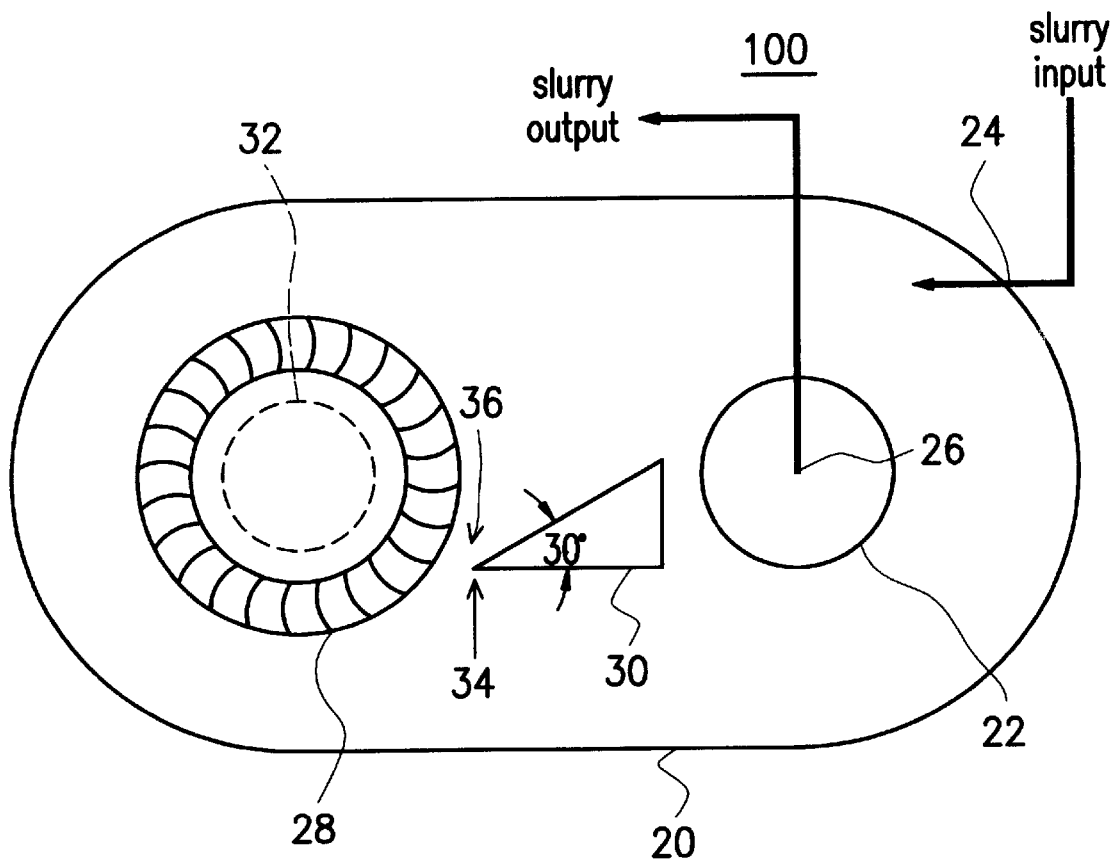
FIG. 3 is a cross-sectional top view of a filtering device according to a preferred embodiment of the present invention.

Refer to FIG. 3, which shows a cross-sectional top view of a filtering device 100 according to a preferred embodiment of the present invention. There is a filter 22 within the filter housing 20 for filtering slurry. The slurry used by the CMP machine in the filter housing 20 is provided by a slurry supplier (not shown) through a pipe via a slurry inlet 24 on the first side of the filter housing 20. In addition, the filter 22 has an opening at the bottom, which covers the slurry outlet 26, through which the slurry to the polishing pad is filtered.

During the grinding in the CMP process, the slurry used to facilitate the CMP process is continuously supplied to the polishing pad through a pipe via a slurry outlet 26 located at the bottom of the filter housing 20.

In another aspect, the filtering device 100 in the invention is equipped with a crossflow fan 28 within the filter housing 20. There is a tongue or so called spoiler 30 somewhere between the crossflow fan 28 and the filter 22, where the crossflow fan 28 and spoiler 30 are made from, for example, Teflon to avoid strong acid or strong base. Furthermore, there is a driving mechanism 32, for example, a motor, relative to the crossflow fan 28 under the filter housing 20, to drive the crossflow fan 28 spinning to agitate the slurry in the filter housing 20. The spoiler 30 is a triangular prism having a tip 34 with a 30-degree angle situated next to the crossflow fan 28.

The driving mechanism 32 is normally on. That is, no matter the CMP machine is grinding or the slurry is being used or not, the driving mechanism 32 keeps driving the crossflow fan 28 spinning to agitate the slurry in the filter housing 20, so as to prevent the adhering problem of slurry particles on the surface of the filter 22, due to the idleness of the filtering device 100.

When the crossflow fan 28 is spinning, the speed of passing through the filter 22 increases. Furthermore, larger particles remain circulating somewhere between the tip 34 of the spoiler 30 and the crossflow fan 28, or the area referred to as 36, instead of flowing to the filter 22, so as to increase the productivity efficiency of the CMP machine, and prolong the lifetime of the filtering device 100.

As a summary, it is the first characteristic that a crossflow fan 28 was equipped within the filter housing 20, under which a driving mechanism 32 relative to the crossflow fan 28 is equipped to drive the crossflow fan 28 spinning to agitate the slurry in the filter housing 20 to avoid the adherence of slurry particles on the surface of the filter 22.

The second characteristic of the invention is that a spoiler 30 is placed between the crossflow fan 28 and the filter 22, so as to keep larger particles in the slurry circulating continuously between the tip 34 of the spoiler 30 and the crossflow fan 28, to increase the productivity efficiency of the CMP machine and prolong the lifetime of the filtering device 100.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device for filtering slurry, comprising:

a filter housing, wherein the filter housing comprises a slurry inlet and a slurry outlet, wherein the slurry inlet is located on the first side of the filter, while the slurry outlet is located at the bottom of the filter;

a filter, equipped within the filter housing, wherein the filter comprises an opening, which covers the slurry outlet;

a crossflow fan, wherein the crossflow fan is equipped within the filter housing;

a driving mechanism, equipped relative to the crossflow fan under the filter housing, used to drive the crossflow spinning to agitate the slurry in the filter housing; and a spoiler, equipped between the crossflow fan and the filter, used to prevent larger particles in the slurry from flowing to the filter.

2. The device of claim 1, wherein said crossflow fan is formed from Teflon.

3. The device of claim 1, wherein said spoiler is formed from Teflon.

4. The device of claim 1, wherein said driving mechanism is a motor.

5. The device of claim 1, wherein said spoiler is a triangular prism, which comprises a tip with a 30-degree angle situated next to the crossflow fan.

* * * * *